United States Patent
Jeyachandran (10) Patent No.: US 9,953,020 B2
(45) Date of Patent: Apr. 24, 2018

(54) COLLABORATIVE BOOKMARKS

(71) Applicant: AVAYA, INC., Basking Ridge, NJ (US)

(72) Inventor: Mareeswaran Jeyachandran, Virudhunagar (IN)

(73) Assignee: Avaya Inc., Basking Ridge, NJ (US)

( * ) Notice: Subject to any disclaimer, the term of this patent is extended or adjusted under 35 U.S.C. 154(b) by 509 days.

(21) Appl. No.: 13/773,345

(22) Filed: Feb. 21, 2013

(65) Prior Publication Data
US 2014/0237347 A1   Aug. 21, 2014

(51) Int. Cl.
G06F 15/173   (2006.01)
G06F 17/24   (2006.01)

(52) U.S. Cl.
CPC ................ *G06F 17/241* (2013.01)

(58) Field of Classification Search
CPC ......... G06F 17/2247; G06F 17/30896; G06F 17/30905; G06F 17/3089; G06F 17/241
USPC ....................................... 715/234
See application file for complete search history.

(56) References Cited

U.S. PATENT DOCUMENTS

| | | | |
|---|---|---|---|
| 6,427,175 B1 * | 7/2002 | Khan | G06F 17/30884 707/E17.114 |
| 8,255,519 B2 * | 8/2012 | Allen | H04L 12/66 370/229 |
| 8,275,870 B2 * | 9/2012 | Czyzewicz | G06Q 10/10 709/203 |
| 2003/0009521 A1 * | 1/2003 | Cragun | G06F 17/30884 709/205 |
| 2008/0147810 A1 * | 6/2008 | Kumar | H04L 67/38 709/206 |
| 2009/0222716 A1 * | 9/2009 | Boerries | G06F 17/30884 715/206 |
| 2011/0206198 A1 * | 8/2011 | Freedman | G06Q 30/06 379/265.03 |
| 2011/0258216 A1 * | 10/2011 | Supakkul | G06F 3/04812 707/769 |

* cited by examiner

*Primary Examiner* — Scott Baderman
*Assistant Examiner* — Hassan Mrabi
(74) *Attorney, Agent, or Firm* — IP Spring (57) ABSTRACT

Methods, systems and computer readable media for collaborative bookmarks are described. For example, a collaborative bookmark method can include generating a collaborative bookmark and associating the collaborative bookmark with a corresponding event. The method can also include detecting an occurrence of the event corresponding to the collaborative bookmark and causing the corresponding collaborative bookmark to be displayed in response to the detection of the event. The method can further include transmitting information from the collaborative bookmark.

17 Claims, 7 Drawing Sheets

FIG. 7 ved collaborative bookmark that has been shared with a first collaborative bookmark account from a second collaborative bookmark account, wherein the second collaborative bookmark account is different from the first collaborative bookmark account. Generating the collaborative bookmark can also include generating a new collaborative bookmark based on one or more parameters received from a user. Generating the collaborative bookmark can further include automatically generating a new collaborative bookmark based on

COLLABORATIVE BOOKMARKS

TECHNICAL FIELD

Embodiments relate generally to electronic information storage, retrieval and exchange, and more particularly, to methods, systems and computer readable media for collaborative bookmarks.

BACKGROUND

For some computer users and in some applications, bookmarking has become a frequently used tool. For example, many computer users may bookmark websites that they wish to revisit or remember. Some conventional bookmarks may have a static format developed for a limited, specific purpose (e.g., a web browser uniform resource locator (URL) bookmark). Also, some conventional bookmarks may be difficult to update, modify and share.

Computer users receive a variety of information from various offline and online sources, such as billboards, websites on the Internet, newspapers, email, discussion boards and the like. In order to be able to store a meaningful bookmark for such diverse information formats and sources, there may be a need for a bookmark system having bookmarks with different types of layouts and user-configurable or customizable layouts. Also, computer users increasingly desire to share information with each other. A need may exist for a bookmark system that permits users to share bookmarks and collaborate on bookmark content.

Embodiments were conceived in light of the above-mentioned problems, limitations and needs, among other things.

SUMMARY

Some implementations include a collaborative bookmark system that provides different bookmark formats and also provides tools to customize bookmark formats. The system can store collaborative bookmarks in a database that is accessible via a network. Thus, with the system, a user can create and customize informational bookmarks from anywhere and can access the collaborative bookmarks from any location having network access.

Some implementations can include a method. The method can include generating, using one or more processors, a collaborative bookmark and associating, using the one or more processors, the collaborative bookmark with a corresponding event. The method can also include detecting, using the one or more processors, an occurrence of the event corresponding to the collaborative bookmark and causing, using the one or more processors, the corresponding collaborative bookmark to be displayed in response to the detection of the event. The method can further include transmitting information from the collaborative bookmark.

Generating the collaborative bookmark can include generating a collaborative bookmark based on a received collaborative bookmark that has been shared with a first collaborative bookmark account from a second collaborative bookmark account, wherein the second collaborative bookmark account is different from the first collaborative bookmark account. Generating the collaborative bookmark can also include generating a new collaborative bookmark based on one or more parameters received from a user. Generating the collaborative bookmark can further include automatically generating a new collaborative bookmark based on detected features of one or more of a web page and a software application user interface.

The event can include a browser connecting to a uniform resource locator and/or an executable application starting or being given focus (e.g., mouse or keyboard focus) by a user. Causing the collaborative bookmark to be displayed can include causing a bookmark view to be displayed. Causing the collaborative bookmark to be displayed can also include causing a design view to be displayed.

Transmitting the information can include sending information from the collaborative bookmark to at least one other system in response to user input. The information can include user contact information and the at least one other system can include a system associated with a connection within a collaborative bookmark system. Transmitting the information can also include automatically populating information fields in a form.

Transmitting the information can further include sharing one or more collaborative bookmarks with another user within a collaborative bookmark system. Sharing one or more collaborative bookmarks with another user within a collaborative bookmark system can be based on an access control list.

Transmitting the information can include communicating with one or more other users of a collaborative bookmark system. The transmitting can occur in response to initiating communications with another user of the collaborative bookmark system.

Some implementations can include a system having a processor and a data storage device coupled to the processor. The data storage device can have stored thereon software instructions that, when executed by the processor, cause the processor to perform operations. The operations can include generating, using one or more processors, a collaborative bookmark and associating, using the one or more processors, the collaborative bookmark with a corresponding event. The operations can also include detecting, using the one or more processors, an occurrence of the event corresponding to the collaborative bookmark and causing, using the one or more processors, the corresponding collaborative bookmark to be displayed in response to the detection of the event. The operations can further include transmitting information from the collaborative bookmark.

Some implementations can include a nontransitory computer readable medium having stored thereon software instructions that, when executed by a processor, cause the processor to perform operations. The operations can include generating, using one or more processors, a collaborative bookmark and associating, using the one or more processors, the collaborative bookmark with a corresponding event. The operations can also include detecting, using the one or more processors, an occurrence of the event corresponding to the collaborative bookmark and causing, using the one or more processors, the corresponding collaborative bookmark to be displayed in response to the detection of the event. The operations can further include transmitting information from the collaborative bookmark.

The operations of the system and/or computer readable medium implementations can include one or more of the following features. Generating the collaborative bookmark can include generating a collaborative bookmark based on a received collaborative bookmark that has been shared with a first collaborative bookmark account from a second collaborative bookmark account. The second collaborative bookmark account can be different from the first collaborative bookmark account. Generating the collaborative bookmark can include generating a new collaborative bookmark based on one or more parameters received from a user.

Generating the collaborative bookmark can include generating a new collaborative bookmark based on detected features of one or more of a web page and a software application user interface.

Transmitting the information can include one or more of: sending information from the collaborative bookmark to at least one other system in response to user input; automatically populating information fields in a form; sharing one or more collaborative bookmarks with another user within a collaborative bookmark system; and communicating with one or more other users of a collaborative bookmark system.

DETAILED DESCRIPTION

In general, a collaborative bookmark can be used to store and share information using a predetermined, dynamic, manually and/or automatically created format. The information can include user demographic information, account information, project information, reference information, shared information about events or activities and/or the like. Collaborative bookmarks can also be used to establish a collaborative communication platform using shared bookmark information and/or communications formats such as chat, video, phone calls and/or the like.

Figure 1:
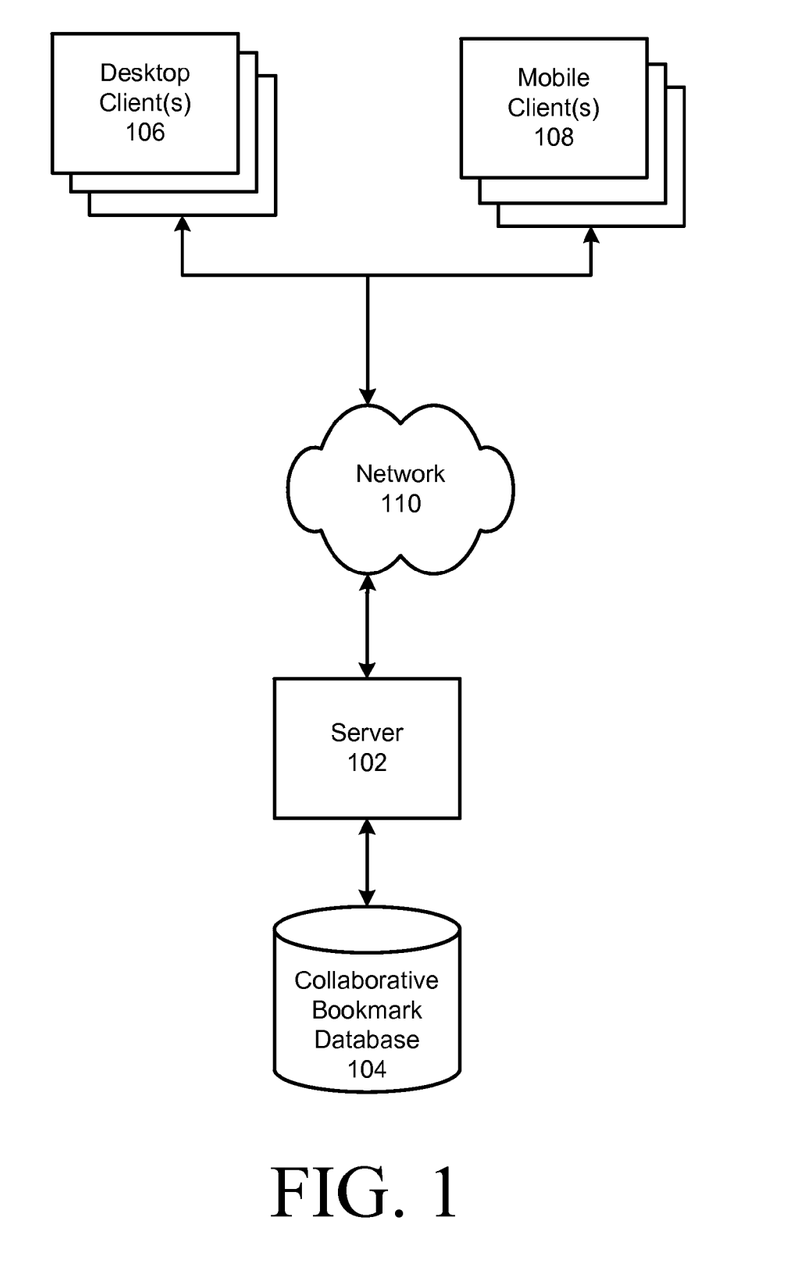
FIG. 1 is a diagram of an example collaborative bookmark system and user environment in accordance with at least one embodiment.

FIG. 1 is a diagram of an example collaborative bookmark system and user environment 100 in accordance with at least one embodiment. The system 100 includes a collaborative bookmark server 102 coupled to a collaborative bookmark database 104.

In operation, one or more client devices such as desktop clients 106 and/or mobile clients 108 can access the collaborative bookmark server 102 via a network 110. The network 110 can include a wired network, a wireless network or a combination of the two. The database 104 can be configured to store collaborative bookmarks and bookmark system user account information.

The collaborative bookmark server 102 and database 104 can be configured to operate according to a collaborative bookmark method including, for example, one or more of the steps of the method shown in FIG. 2 and described below.

Figure 2:
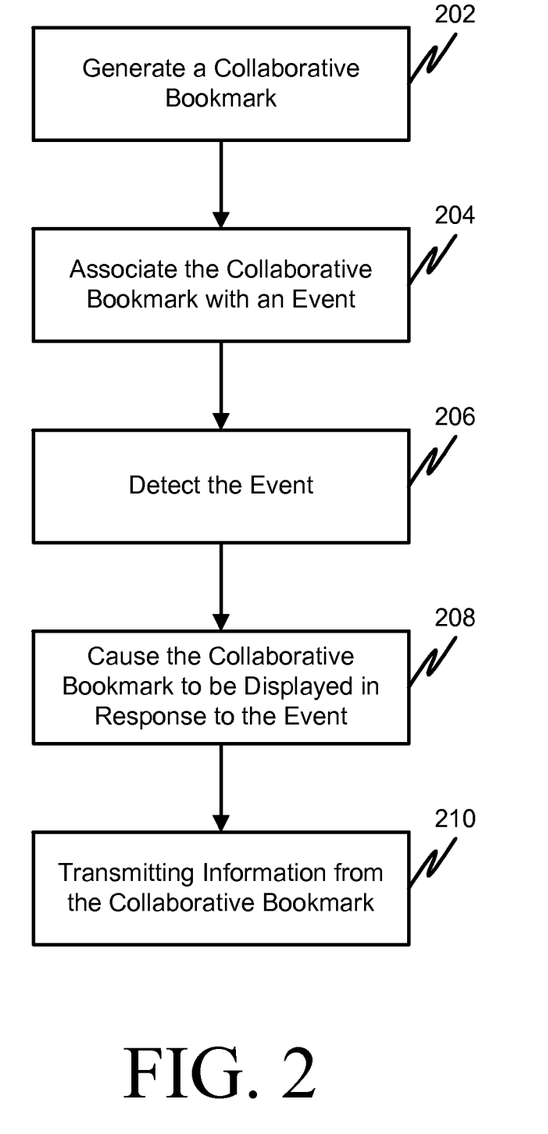
FIG. 2 is a flow chart of an example collaborative bookmark method in accordance with at least one embodiment.

FIG. 2 is a flow chart of an example collaborative bookmark method 200 in accordance with at least one embodiment. Processing begins at 202, where a collaborative bookmark is generated. Collaborative bookmarks can be generated by generating a new bookmark based on a shared bookmark. Collaborative bookmarks can also be generated by automatically creating a bookmark based on an application or website (e.g., a collaborative bookmark can be automatically generated based on the form fields on a web page). Collaborative bookmarks can also be created manually using a collaborative bookmark design user interface (e.g., similar to that shown in FIG. 5 and described below). Also, a combination of the above can be used. For example, the system can automatically generate a bookmark based on a web page and then a user can manually alter the automatically generated bookmark. Processing continues to 204.

At 204, the collaborative bookmark is associated with an event. An event can include one or more of an application opening and/or receiving focus (e.g., keyboard or mouse focus, or other type of focus for mobile devices). An event can also include a browser being directed to a uniform resource locator (URL). In general, any suitable computer generated event can be associated with a collaborative bookmark. Processing continues to 206.

At 206, a user (or client) device detects the event and signals the collaborative bookmark application. An accessory application may be used as an intermediary between the user device and the collaborative bookmark application. For example, the accessory application could include a browser add-on that monitors the URLs being requested from the browser and signals the collaborative bookmark system when a URL that is associated with an event is requested, or the accessory may monitor for the execution of certain application programs associated with an event. Processing continues to 208.

At 208, the collaborative bookmark associated with the event is caused to be displayed on the user device. The user can then interact with the bookmark (e.g., view, edit, take action or the like). Processing continues to 210.

At 210, information from the bookmark is transmitted. For example, the collaborative bookmark system may use information from the bookmark to auto-populate fields in a web page form. Also, the collaborative bookmark system may share the collaborative bookmark with another user in the collaborative bookmark system, the sharing of the bookmark may be performed in accordance with an access control list (or list of users and corresponding permissions). In another example, information from the bookmark is sent to other users or system at the request of the collaborative bookmark user. For example, a user can update contact information and then send the contact information bookmark to all user to which that bookmark has been shared. In this way, a user can update all contacts (e.g., friends, relatives, co-workers, businesses or the like) with new information with one action using the collaborative bookmark system. In yet another example, a user can communicate with other users via the collaborative bookmark system. The communication can include one or more of chat, email, phone call, audio/video conference or the like. The communication can also include sending or responding to a request to connect and/or a request to share a bookmark. The communication can also include a combination of one or more of the above (e.g., initiating a chat with a customer service representative and also sending a bookmark with the customer's information).

It should be appreciated that 202-210 can be repeated in whole or in part in order to accomplish a collaborative bookmark task.

Collaborative bookmarks can be used for many different purposes. For example, a bookmark can be established for a train ticket booking website. When booking a train ticket, a user typically needs to have information available such as credit card or debit card information in order to book the ticket. A collaborative bookmark can be created that contains all of the necessary information for booking train tickets. Further, the train ticket bookmark can be triggered by an event, such as the user accessing the train ticket website with a browser. The information stored in the bookmark can be automatically loaded into the appropriate fields of the train ticket website.

Figure 3:
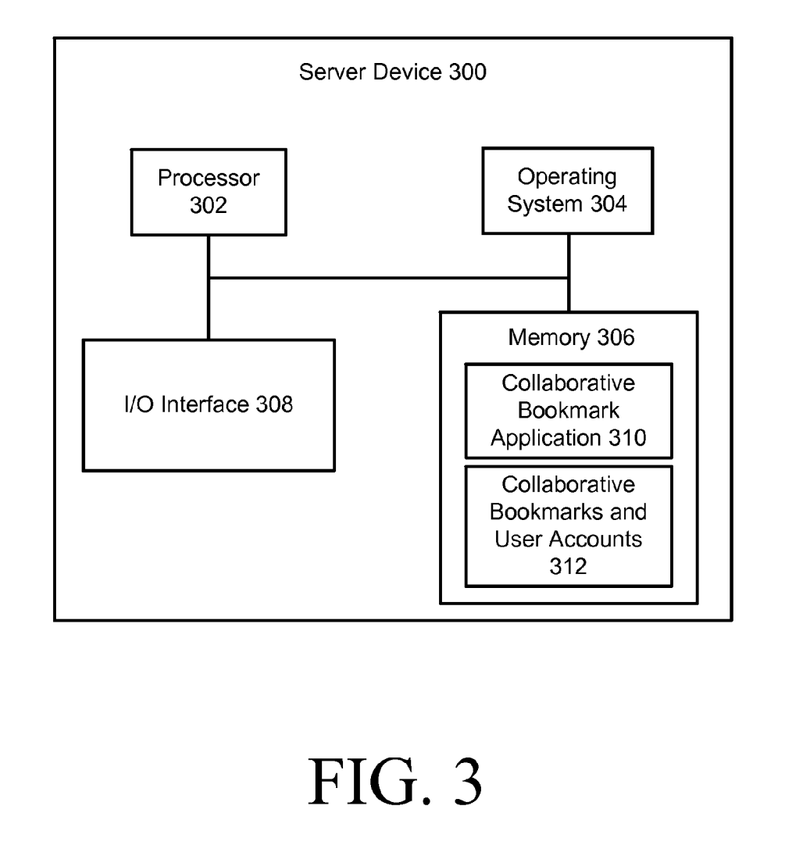
FIG. 3 is a diagram of an example computer system configured for processing collaborative bookmarks in accordance with at least one embodiment.

FIG. 3 is an example computer system 300 (e.g., server and/or call server) for collaborative bookmarks in accordance with at least one embodiment. The computer system 300 includes a processor 302, operating system 304, memory 306 and I/O interface 308. The memory 306 can include a collaborative bookmark application 310 and one or more collaborative bookmarks and user accounts 312.

In operation, the processor 302 may execute the application 312 stored in the memory 306. The application 312 can include software instructions that, when executed by the processor, cause the processor to perform operations for collaborative bookmarks in accordance with the present disclosure (e.g., performing one or more of steps 202-210 described above).

The application program 312 can operate in conjunction with the stored collaborative bookmarks and user accounts 312 and the operating system 304.

Figure 4:
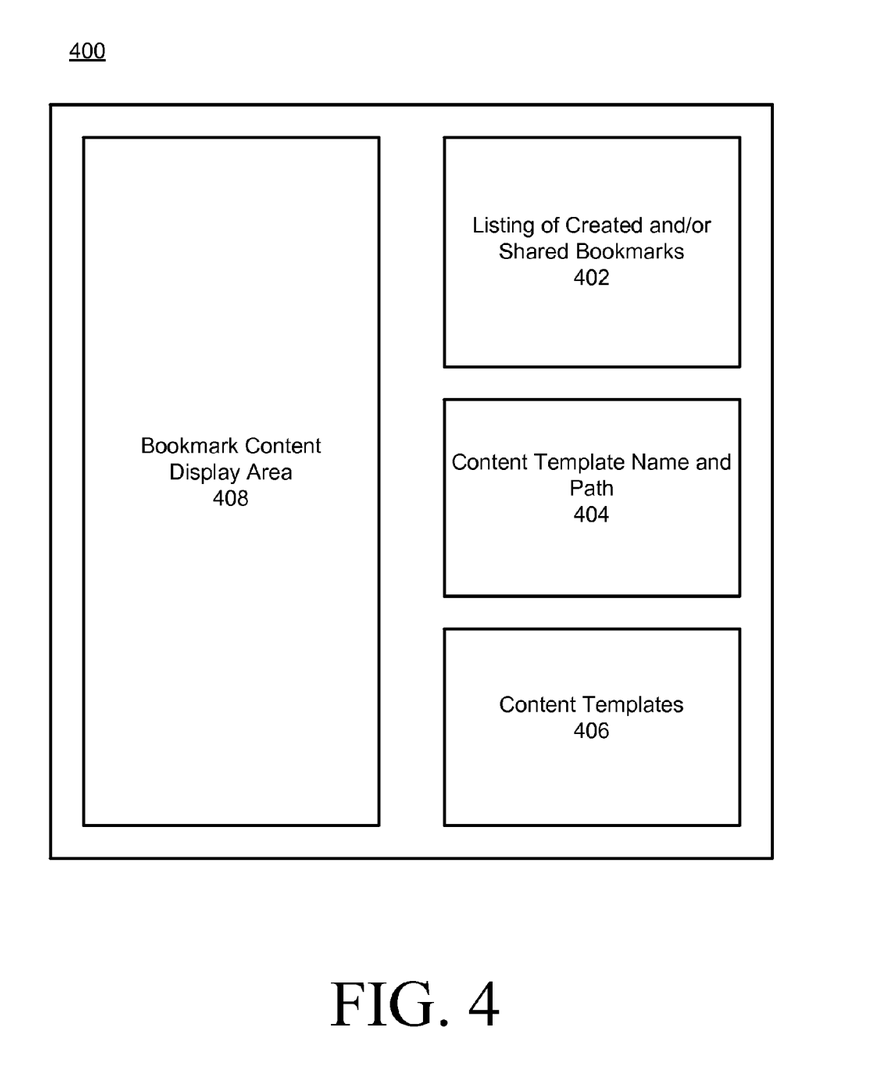
FIG. 4 is a diagram of an example user interface screen for viewing collaborative bookmarks in accordance with at least one embodiment.

FIG. 4 is a diagram of an example user interface screen 400 for viewing collaborative bookmarks in accordance with at least one embodiment. The user interface 400 includes a listing of created and/or shared bookmarks 402, content template name and path 404, a listing of available content templates 406 and a bookmark content display area 408.

Figure 5:
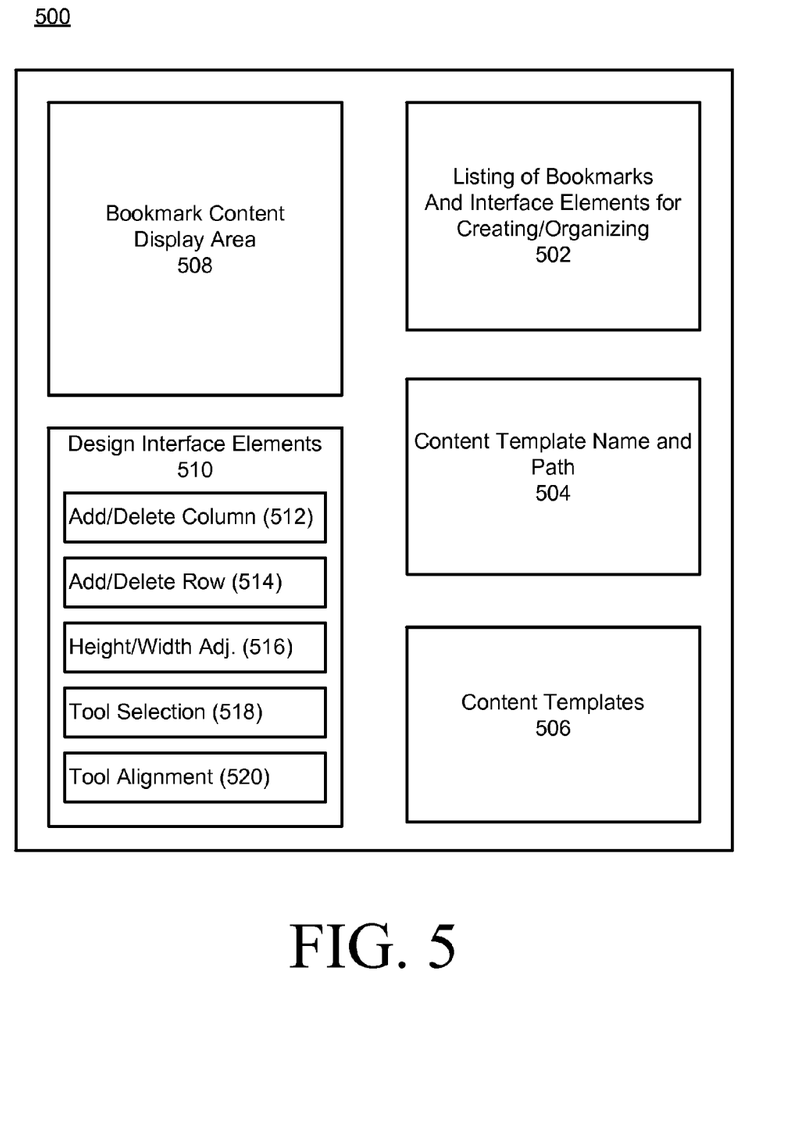
FIG. 5 is a diagram of an example user interface screen for designing collaborative bookmarks in accordance with at least one embodiment.

The listing of created/shared bookmarks 402 can include a list of created bookmarks and shared bookmarks organized in the manner set forth in the design view (see FIG. 5). The content template name and path 404 shows the full name and path of the currently selected bookmark template. The bookmark content display area 408 shows the selected bookmark name and path along with the contents of the selected bookmark.

FIG. 5 is a diagram of an example user interface screen for designing collaborative bookmarks in accordance with at least one embodiment. The bookmark designer user interface 500 includes a listing of bookmarks 502, content template name and path 504, content templates 506, bookmark content display area 508, and design interface elements 510.

The design interface elements 510 include an add/delete column element 512, an add/delete row element 514, height/width adjustment element 516, tool selection element 518 and a tool alignment selection 520.

In operation, a user can create a bookmark using the bookmark designer user interface 500. The listing of created or shared bookmarks 502 can include a listing of bookmarks and user interface elements for organizing the bookmarks (e.g., create folder, delete folder, add a bookmark, and delete a bookmark. Also, bookmarks can be moved to folders using a drag-and-drop style interface. The content template name and path 504 includes elements for saving a selected template to the selected bookmark and for saving a copy of a template or bookmark as a different name.

The design interface elements 510 section contains tools for designing a bookmark. A user first needs to one column or one row (e.g., a rectangular area) using the add/delete column element 512 and the add/delete row element 514. Optionally, a user can start with a template selected from the content templates 506. Once an initial area is created, it can be split into multiple columns and/or rows using the add/delete column element 512 and the add/delete row element 514. The height and width of the columns and rows can be adjusted using the height/width adjustment element 516.

The tool selection element 518 permits a user to select among a label, a list, a drop down list, a text box, a calculator, a call button a send email button, a record/play button, a browse URL button and/or the like. The tool alignment selection 520 can be used to align a tool (or user interface element) inserted into the bookmark being designed.

Figure 6:
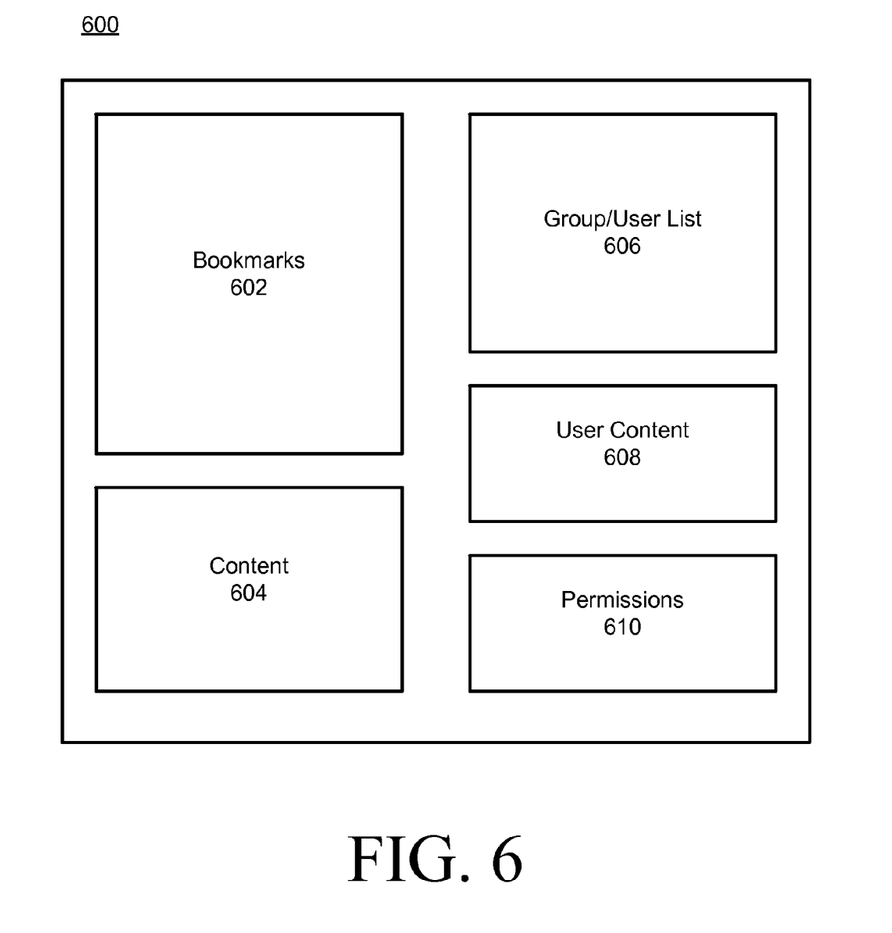
FIG. 6 is a diagram of an example user interface screen for sharing collaborative bookmarks in accordance with at least one embodiment.

FIG. 6 is a diagram of an example user interface screen for sharing collaborative bookmarks 600 in accordance with at least one embodiment. The user interface 600 includes a listing of bookmarks 602, content viewing section 604, group/user list 606, user content 608, and permissions 610.

In operation, a user can share a bookmark using the sharing user interface 600. The user can send the share request to one or more other collaborative bookmark users for acceptance. A list of available bookmarks is displayed in the bookmarks section 602. The contents of the selected bookmark (or a portion thereof) are displayed in the content section 604. A user can search for other users in the group/user list section 606. The user can send a share request via a Send Request user interface element (not shown) adjacent to a user name in the group/user list section 606.

In the user content section 608, a user can view the bookmark information of a selected user or group. The permissions section 610 can be used to set the sharing permission level (e.g., full control, edit, read only). The combination of the user list and the permissions permit a user to establish an access control list for a bookmark.

In addition to being able to share a whole bookmark with one or more other users, a user can share a partial bookmark (e.g., a single row or group of rows) with other users.

Figure 7:
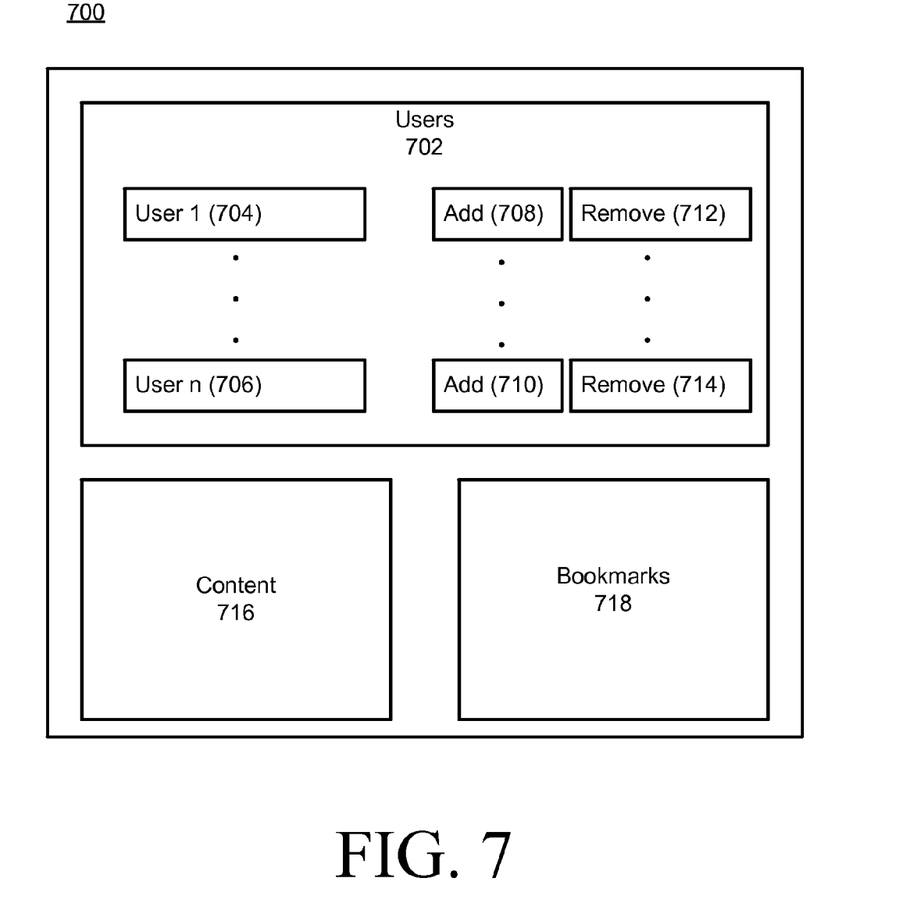
FIG. 7 is a diagram of an example user interface screen for viewing new connection requests in a collaborative bookmark system in accordance with at least one embodiment.

FIG. 7 is a diagram of an example user interface screen for viewing new connection/sharing requests 700 in a collaborative bookmark system in accordance with at least one embodiment. The user interface 700 includes a users section 702, a content section 716, and a bookmarks section 718.

In operation, a user can view all new sharing/connection requests in the users section 702 and respond to them by adding (or accepting) or removing (or denying) each request, by selecting the corresponding user interface element (e.g., 708-710 or 712-714). In the content section 716, a user can see the biographical (or About Me) of a user selected in the user section 702. The bookmarks section 718 can be used to view, store and organize user sharing/connection requests (e.g., using folders).

In addition to the user interface screens shown in the figures and described above. A collaborative bookmark system may also include a number of other user interfaces.

A login screen can include fields for user name (e.g., email address or user name), password, login button and a join button. The join button can be used to register for the collaborative bookmark service.

A join user interface screen can include fields for name (e.g., first, middle and/or last), email address and password. A main navigation window can include a selection button that, when pressed, opens a navigation window. The navigation window can include menu selections for the bookmark view (e.g., FIG. 4), the design view (e.g., FIG. 5), settings, profile, sharing (e.g., FIG. 6) and new requests/updates (e.g., FIG. 7).

The setting user interface can include selections for enabling or disabling various features such as automatic browser navigation indication, which automatically detects the browser URL and displays the corresponding bookmark and contents. Another feature, automatic folder indication, can be used to display a bookmark associated with a folder address opened in the system.

Another feature can include a call option in which a user can call another collaborative bookmark user via a system generated phone number. A user interface element can be provided for selecting a default collaboration solution such as chat, video or none. Also, a default or base bookmark template can be selected from the settings interface.

A profile user interface screen can include fields for entering profile information for a user. For example, the profile information can include first and last name, password, date of birth, mobile phone number, address, country, city, zip code, time zone and "about me" or biographical information.

It will be appreciated that the modules, processes, systems, and sections described above can be implemented in hardware, hardware programmed by software, software instructions stored on a nontransitory computer readable medium or a combination of the above. A system for collaborative bookmarks, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, or the like.

It is, therefore, apparent that there is provided, in accordance with the various embodiments disclosed herein, systems, methods and computer readable media for collaborative bookmarks.

While the disclosed subject matter has been described in conjunction with a number of embodiments, it is evident that many alternatives, modifications and variations would be, or are, apparent to those of ordinary skill in the applicable arts. Accordingly, Applicant intends to embrace all such alternatives, modifications, equivalents and variations that are within the spirit and scope of the disclosed subject matter.

What is claimed is:
1. A method comprising:
generating, using one or more processors, a collaborative bookmark based on one or more parameters received from a user;
accessing, using the one or more processors, a website associated with the collaborative bookmark;
detecting, using the one or more processors, the accessing of the website associated with the collaborative bookmark;

causing, using the one or more processors, the collaborative bookmark to be activated in response to the detection of the accessing, wherein the collaborative bookmark is activated subsequent to the accessing of the website;
automatically populating fields in a web page form of the website corresponding to the collaborative bookmark with information from the collaborative bookmark; and
providing a user interface configured to permit customization of a format of the collaborative bookmark based on input received from the user through the user interface.

2. The method of claim 1, wherein generating the collaborative bookmark includes generating a collaborative bookmark based on a received collaborative bookmark that has been shared with a first collaborative bookmark account from a second collaborative bookmark account, wherein the second collaborative bookmark account is different from the first collaborative bookmark account.

3. The method of claim 1, wherein generating the collaborative bookmark includes automatically generating a new collaborative bookmark based on detected features of one or more of a web page and a software application user interface.

4. The method of claim 1, wherein the accessing includes a browser connecting to a uniform resource locator.

5. The method of claim 1, wherein causing the collaborative bookmark to be displayed includes causing a bookmark view to be displayed.

6. The method of claim 1, wherein causing the collaborative bookmark to be displayed includes causing a design view to be displayed.

7. The method of claim 1, wherein transmitting the information includes sending information from the collaborative bookmark to at least one other system in response to user input.

8. The method of claim 7, wherein the information includes user contact information and the at least one other system includes a system associated with a connection within a collaborative bookmark system.

9. The method of claim 1, further comprising sharing one or more collaborative bookmarks with another user within a collaborative bookmark system is based on an access control list.

10. The method of claim 1, wherein transmitting the information includes communicating with one or more other users of a collaborative bookmark system.

11. The method of claim 10, wherein the transmitting occurs in response to initiating communications with another user of the collaborative bookmark system.

12. A system comprising:
a hardware processor; and
a nontransitory data storage device coupled to the hardware processor, the nontransitory data storage device having stored thereon software instructions that, when executed by the hardware processor, cause the hardware processor to perform operations including:
generating, using the hardware processor, a collaborative bookmark based on one or more parameters received from a user;
accessing, using the hardware processor, a website associated with the collaborative bookmark;
detecting, using the hardware processor, the accessing of the website associated with the collaborative bookmark;
causing, using the hardware processor, the collaborative bookmark to be activated in response to the detection of the accessing, wherein the collaborative bookmark is activated subsequent to the accessing of the website;
automatically populating fields in a web page form of the website associated with the collaborative bookmark with information from the collaborative bookmark; and
providing a user interface configured to permit customization of a format of the collaborative bookmark based on input received from the user through the user interface.

13. The system of claim 12, wherein generating the collaborative bookmark includes one or more of:
generating a collaborative bookmark based on a received collaborative bookmark that has been shared with a first collaborative bookmark account from a second collaborative bookmark account, wherein the second collaborative bookmark account is different from the first collaborative bookmark account;
generating a new collaborative bookmark based on one or more parameters received from a user; and
generating a new collaborative bookmark based on detected features of one or more of a web page and a software application user interface.

14. The system of claim 12, wherein transmitting the information includes one or more of:
sending information from the collaborative bookmark to at least one other system in response to user input;
sharing one or more collaborative bookmarks with another user within a collaborative bookmark system; and
communicating with one or more other users of a collaborative bookmark system.

15. A nontransitory computer readable medium having stored thereon software instructions that, when executed by a hardware processor, cause the hardware processor to perform operations including:
generating, using the hardware processor, a collaborative bookmark based on one or more parameters received from a user;
accessing, using the hardware processor, a website associated with the collaborative bookmark;
detecting, using the hardware processor, the accessing of the website associated with the collaborative bookmark;
causing, using the hardware processor, the collaborative bookmark to be activated in response to the detection of the accessing, wherein the collaborative bookmark is activated subsequent to the accessing of the website;
automatically populating fields in a web page form of the website associated with the collaborative bookmark with information from the collaborative bookmark; and
providing a user interface configured to permit customization of a format of the collaborative bookmark based on input received from the user through the user interface.

16. The nontransitory computer readable medium of claim 15, wherein generating the collaborative bookmark includes one or more of:
generating a collaborative bookmark based on a received collaborative bookmark that has been shared with a first collaborative bookmark account from a second collaborative bookmark account, wherein the second collaborative bookmark account is different from the first collaborative bookmark account;
generating a new collaborative bookmark based on one or more parameters received from a user; and generating a new collaborative bookmark based on detected features of one or more of a web page and a software application user interface.

17. The nontransitory computer readable medium of claim 15, wherein transmitting the information includes one or more of:
sending information from the collaborative bookmark to at least one other system in response to user input; and
communicating with one or more other users of a collaborative bookmark system.

\* \* \* \* \*